Oct. 27, 1959 C. VAN DER LELY ET AL 2,909,943
FLUID COUPLING
Filed Jan. 24, 1956 3 Sheets-Sheet 2

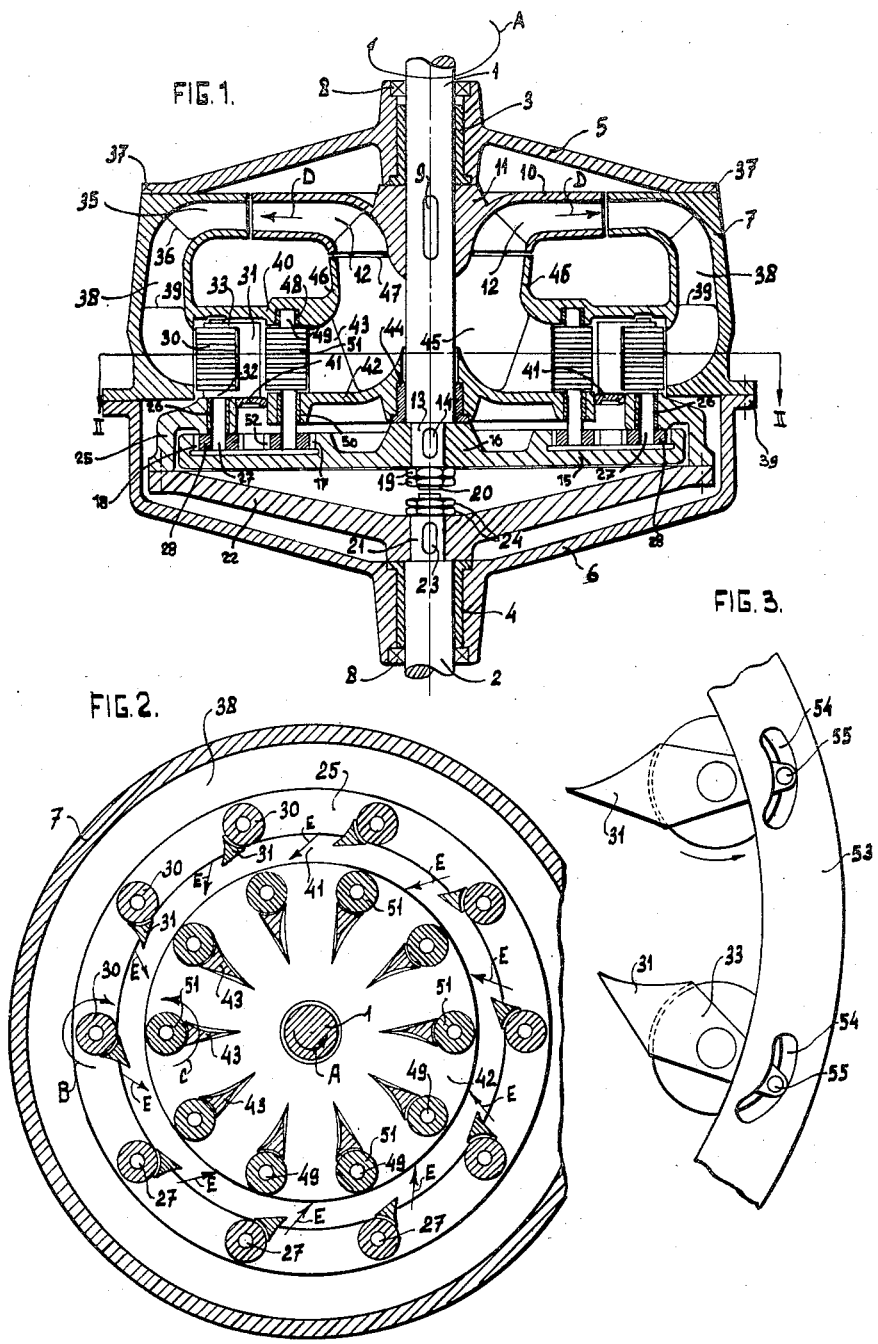

Oct. 27, 1959  C. VAN DER LELY ET AL  2,909,943
FLUID COUPLING

Filed Jan. 24, 1956   3 Sheets-Sheet 3

United States Patent Office 2,909,943
Patented Oct. 27, 1959

2,909,943

FLUID COUPLING

Cornelis van der Lely and Ary van der Lely, Maasland, Netherlands; said Ary van der Lely assignor to said Cornelis van der Lely Application January 24, 1956, Serial No. 561,083

3 Claims. (Cl. 74—688)

The invention relates to a device for transmitting torque from a rotatable shaft to another shaft, during which transmission a circulating fluid exerts a braking force on one shaft and a driving force on the other shaft.

In known devices of this kind both shafts and the casing of the device carry concentric blades along which flows a liquid stream which exerts over said blades the driving force and the braking force. For enabling the attainment of a large driving force when the driving shaft has a low speed, the blades of one of the rims are often adjustable.

It is an object of the invention to replace the blades by other flow diverting members owing to which new possibilities are attained for adapting the driving force to various circumstances. According to the invention, the device is such that at least the force on one of said shafts or a force on the casing of the device is effected at least partially by means of rotating flow affecting members.

Figure 4:
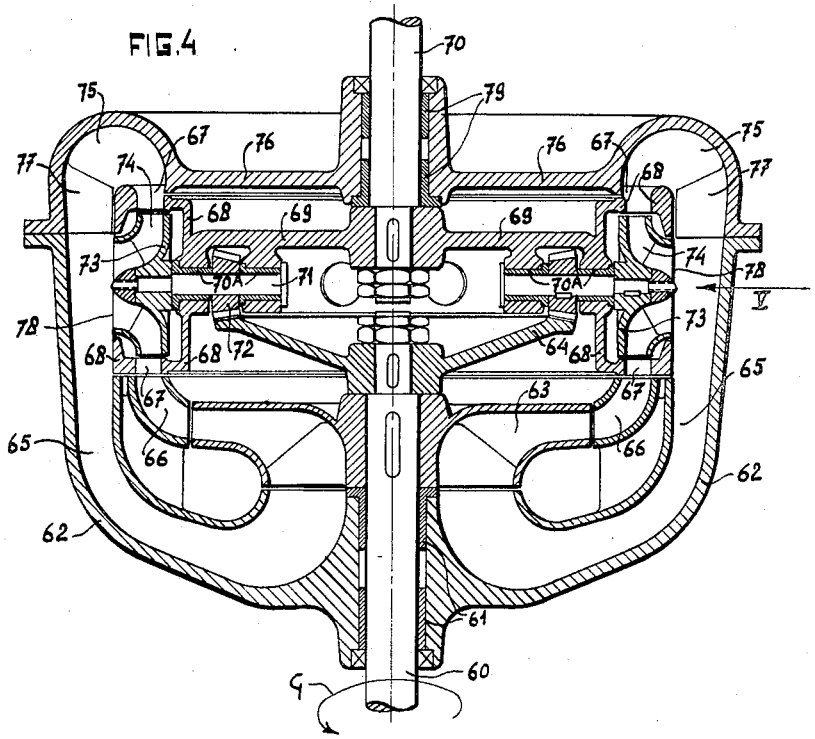
Figure 5:
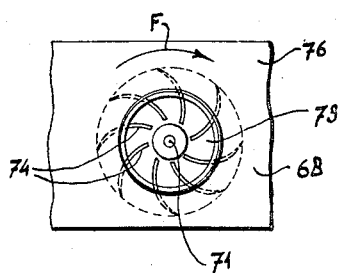
Figure 6:
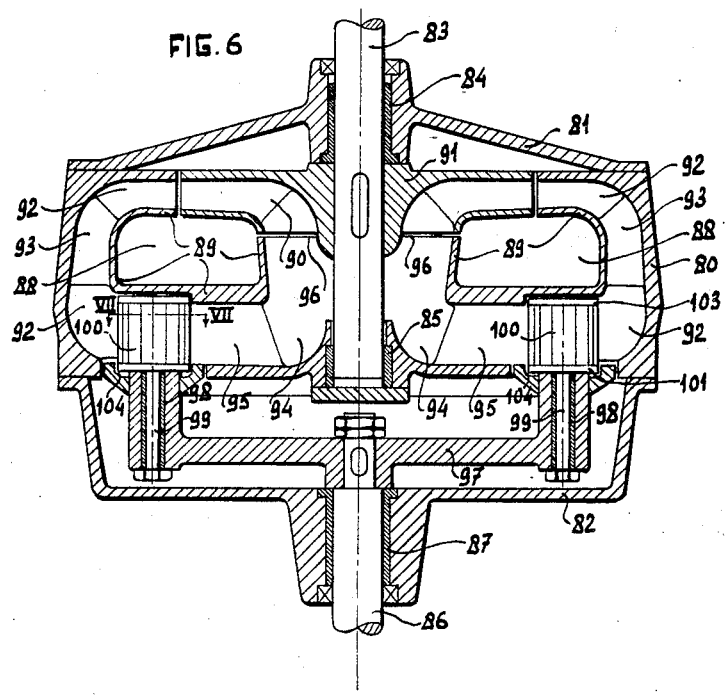
Figure 7:
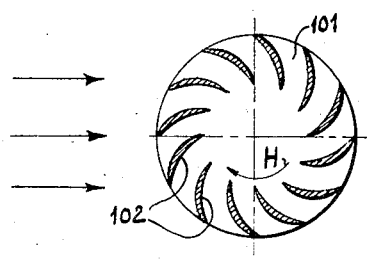

Further details will be hereinafter more fully described with reference to the accompanying drawing in which some preferred embodiments of the invention have been illustrated by way of example and in which:

Fig. 1 shows an axial sectional view through a first embodiment of the invention, Fig. 2 shows a sectional view of the same embodiment perpendicular to the shaft according to line II—II in Fig. 1, Fig. 3 shows, on a larger scale, a view of a variant of a detail of the construction of Figs. 1 and 2 concerning the adjustment of guide members, Fig. 4 represents an axial sectional view through another embodiment of the invention, Fig. 5 shows a view of a part of the device according to Fig. 4, seen in the direction of arrow V, Fig. 6 represents an axial sectional view through a third embodiment of the invention, Fig. 7 shows, on a larger scale, a sectional view of a part of the construction of Fig. 6 according to the line VII—VII.

According to Fig. 1 there are provided a driving shaft 1 and a driven shaft 2 which are in alignment and are situated in bearings 3 and 4 respectively supported in covers 5 and 6 of a casing 7. The covers 5 and 6 are connected in fluid tight manner to the casing 7, and a fluid packing 8 is mounted between the shaft 1 and the cover 5 as well as between the shaft 2 and the cover 6. A blade wheel having a hub 11 and blades 12 is mounted on the shaft 1 by means of a cotter 9. A disc 15 having a hub 16 is mounted on an attenuated end 13 of the shaft by means of a cotter 14, said disc being provided with an externally toothed rim 17 and an internally toothed rim 18. The hub 16 is enclosed between the thick part of the shaft 1 and nuts 19 on a projection 20 of the end 13, said projection being provided with a thread.

Further, a conical disc 22 is secured on an attenuated part 21 of the shaft 2 by means of a cotter 23 and nuts 24.

A ring 25 is attached to the disc 22 and carries ten bearings 26 for spindles 27 parallel to the shafts 1 and 2. Directly beneath bearings 26, each of the spindles 27 carries a toothed wheel 28 engaging the toothed rim 18 of the disc 15. The free upper end of each spindle 27 carries a member 30 which is substantially circular and which is fixedly attached thereto, and a substantially triangular body 31 carrying two arms 32 and 33 which hinge on spindle 27 jointly with the body 31.

The blades 12 of the centrifugal wheel 10 are located in a duct constituted by the centrifugal wheel 10 which duct continues into a duct 35 in the casing 7. The duct is directed downwards near the edge 37 of the cover 5 and constitutes an annular duct 38 directed to the inside near the external edge 39 of the cover 6. In the duct 38, there are partitions 36 which are principally intended to link the walls of the duct 38 to one another.

The duct for the fluid proceeds further between a wall 40 forming an integral part of the casing 7 and the ring 25 followed by a ring 41 and a disc 42 carrying said ring 41 with inconsiderable play. The disc 42 is linked with the wall 40 by means of flow guide members 43 and thus is in the position of rest when the casing 7 is in its position of rest, which is normally the case. A bearing 44 for the shaft 1 is provided in the disc 42 near the end 13. The fluid duct bends upwards near the shaft 1 and constitutes an annular duct 45, which is limited by the shaft 1 and a wall 46 fixedly attached to the wall 40 and the duct opens into an annular axial inlet opening 47 of the centrifugal wheel 10.

Ten bearings 48 for the upper ends of spindles 49, which are parallel to the shafts 1 and 2, are mounted in the wall 40, bearings 50 for said spindles being provided in the disc 42. Between the bearings 48 and 50, each spindle 49 carries a cylindrical member 51 fixedly attached on said spindle 49, which member 51 is located in the fluid duct described above. A toothed wheel 52 is fixedly mounted on the lower end of each spindle 49 and engages the toothed rim 17.

The device works as follows. The driving shaft 1 is rotated in the direction of the arrow A by a motor, e.g. by a combustion motor (not shown). The casing 7 always stands still and it is assumed that initially the shaft 2, which can be coupled, for example, to the driven wheels of a vehicle, is in its position of rest and has to be set in motion by means of the shaft 1. At first, the shaft 2 and the disc 22 are in their position of rest, whereas the disc 42 is always in its position of rest, so that the rims 18 and 17 cause the toothed wheels 28 and 52 situated on the spindles 27 and 49 to rotate in the direction indicated by the arrows B and C, respectively, owing to which the cylinders 30 and 51 also rotate according to the arrows B and C, respectively.

The centrifugal wheel 10 causes a fluid stream to come into existence, the fluid streaming in the direction of the arrow D from the shaft 1. The stream is led around through the ducts 35 and 38, so that it flows to the shaft 1 in the vicinity of the cylinders 30. The cylinders form flow affecting members working in accordance with the Magnus principle, see "Hydraulics and the Mechanics of Fluids," E. H. Lewitt, 9th edition, London, Pitman and Sons, page 609, so that the stream which is directed substantially radially prior to encountering before the members 30 has the direction of the arrows E following said members. The members 51 modify the direction of the stream again, so that when the stream has passed the members 51 it is directed radially to the inside again. The fluid flows again to the centrifugal wheel 10 through the duct 45.

Every diversion of the stream is attended by a considerable force exerted over the associated flow affecting or guide member so that a considerable force is exerted on the disc 22, which force tends to rotate the shaft 2 in the direction of the arrow A. An opposite force is exerted on the casing 7. The driving force is, however, much greater than the braking force to which the centrifugal wheel 10 is subject.

When the shaft 2 is set in motion and has attained a velocity of, for example, one tenth of the velocity of the axle 1, the velocity of rotation of the cylindrical members 30 is reduced by 10%, owing to which the driving force decreases accordingly. In the first as well as in the second case, the device has only small losses which means in the first case that the shaft 1 is almost without load. The efficiency is high for intermediate cases too.

The cylindrical members 30 are followed by flow guide members 31, which can freely adjust themselves conformably to the stream. The flow guide members 43 situated behind the cylindrical members 51 on the other hand are fixedly mounted. However, said flow guide members can also be self-adjustable. If an optimum position for certain flow guide members, e.g. the members 31, is expected, but this position is not theoretically determinable, a ring 53 can be used (see Fig. 3) in which curved slots 54 are provided; pins 55 extending through apertures in the arms 33 and through the slots 54 can be used for adjusting the position of the members 31 until the most favorable position has been found.

The force exerted over a cylinder rotating across a stream equals the propelling pressure of the stream multiplied by the surface of the axial section of the cylinder and a coefficient of force which depends, when the cylinder has a smooth surface, only on the proportion of the circumferential velocity of the cylinder to the velocity of the stream at a distance of the cylinder. In definite fields of said proportion, the coefficient of force can be increased by measures, among other things applied to the surface of the cylinder. For instance, ribs can be provided on the cylinder or the surface can be formed by blades whereby fluid can stream through the clefts formed between the blades. There will next be described a case in which fluid sucked sidewards by the body, flows to the outside through such clefts.

According to Fig. 4 a driving shaft 60 is journalled in a casing 62 by means of a bearing 61. Above the bearing 61, the upper end of the shaft 60 carries a centrifugal wheel 63 and, above wheel 63 a conical toothed wheel 64, all of which members move with the shaft 60.

The centrifugal wheel 63 receives fluid flowing in axial direction towards it and leaving via an annular duct 65 defined by the casing 62. The fluid displaced radially to the outside by means of the centrifugal wheel 63 through another annular duct 66 defined by the casing 62, is led to an annular duct 67 in the edge 68 of a disc 69. The disc 69 is fixedly mounted on the driven shaft 70 situated coaxially with the shaft 60 and carries six pairs of bearings 70A in which six spindles 71 are arranged, the axes of which intersect the shaft 70. Each spindle 71 carries between two bearings 70A a conical toothed wheel 72 engaging the conical toothed wheel 64, and the end of each spindle, which end is directed away from the shaft 70, carries a blade wheel 73 (see also Fig. 5) the blades 74 of which cause the wheel to work as a centrifugal pump with the blade wheel rotating in the direction of the arrow F. The fluid flowing through the duct 67 into which the external edge of each blade wheel 73 extends flows jointly with the fluid supplied by the blade wheel 73 into a duct 75 constituted by a cover 76 of the casing 62. Through this duct in which guide blades 77 are situated, the fluid is led back to the duct 65 in the casing 62. The fluid streams along the inlet openings 78 of the blade wheels 73 and a part of the fluid thus can be sucked away by the working of said blade wheels, whereas the greater part of the fluid flows through the duct 65 towards the centrifugal wheel 63. The driven shaft 70 is rotatably supported in bearings 79 which are arranged in the cover 75.

The working of the device is as follows. When the shaft 60 rotates in the direction G, the toothed wheel 64 is rotated with it and, assuming that the shaft 70 does not move, said toothed wheel 64 drives the toothed wheels 72 in such a way that the blade wheels 73 will rotate in the direction F (Fig. 5). In this case, the blades 74 incline rearwardly and they direct fluid, entering axially through the apertures 78, radially to the outside into the duct 67. At the same time, the centrifugal wheel 63 urges fluid through the duct 67, which fluid exerts considerable lateral forces over the blade wheels 73 working as rotors in accordance with the Magnus principle, so that a force will come into existence which tends to rotate the shaft 70 in the direction G. When the shaft 70 begins to move, the relative velocity between the toothed wheel 64 and the disc 69 will decrease, due to which the velocity of rotation of the blade wheels 73 decreases along with the driving force on the shaft 70.

The fluid leaving the duct 67 is led back through the duct 75 and the duct 65 to the centrifugal wheel 63. A small part flows, however, through the apertures 78 axially into the blade wheels 73. The effect of the construction of the flow affecting members 73, comprising circumferential blades between which fluid flows to the outside, consists in that, in definite fields of working in which the value of the coefficient of force otherwise would become low (and sometimes even inadmissibly low), said coefficient of force preserves a high or at least an admissible value.

The coupling according to Fig. 6 is composed of a casing 80 comprising two covers 81 and 82, the driving shaft 83 being supported in a bearing 84 in the cover 81 and in a bearing 85 in the casing 80, while the driven shaft 86 rotates in a bearing 87 in the cover 82. In the casing 80, the fluid can circulate in an annular space 88 filled with fluid but not participating in the working of the device in an active way, the wall 89 of said space 88 forming for the greater part an integral portion of the casing 80. The fluid circulating in the space 88 flows through a duct provided with blades 90 and arranged in a centrifugal wheel 91 fixedly attached on the shaft 83. Further, the fluid flows through a duct 92 substantially composed of a casing 80, in which duct 92 partitions 93 are provided for linking the walls, and through a duct 94 in which guide means 95 are arranged. The ducts 92 and 94 merge into one another and lead the fluid back to the inlet opening 96 of the centrifugal wheel 91.

The shaft 86 carries a disc 97 which is fixedly attached to said shaft, in which disc 97 six supports 89 are arranged for six spindles 99 in parallel to the shaft 86, each of said spindles carrying at a projecting free extremity a flow affecting member 100. Each member 100 consists of a disc 101 fixedly attached to the spindle 99 and a disc 103 connected to said disc 101 by means of blades 102 (see Fig. 7). Said members extend through an annular groove in the lower side of the casing 80. An annular plate 104 mounted on the disc 97 blocks up the annular groove with the required play.

The device works as follows. When the shaft 83 rotates the centrifugal wheel 91 gives rise to a fluid stream which flows back through the ducts 92 and 94 to the centrifugal wheel along (and partially through) the flow affecting members 100. The position and the shape of the blades are such that if the member 100 is in a fluid stream they will rotate in the direction of the arrow H in Fig. 7, by which the member 100 in question will begin to work as a rotor in accordance with the Magnus principle. As a result, a driving force is exerted over the shaft 86.

It will be obvious that it is not necessary to cause the fluid stream caused by the centrifugal wheel 91 to drive the member 100, but that the rotation can be obtained by means of a separate fluid stream driving a member mounted separately on the axle 99. It will be possible to cause a driving force on the shaft 86, said driving force depending on the difference of the velocity between the shafts 83 and 86 or to control the device in such a way that if the shaft 86 stands still the force will be greatest.

What we claim is:

1. A transmission device comprising a rotated driving shaft, a driven shaft, a plurality of rotors, means rotatably mounting said rotors on said driven shaft at locations spaced radially from the axis of the latter, fluid displacing means operated in response to rotation of said driving shaft, means for rotating said rotors, guide means receiving fluid from said fluid displacing means and directing streams of fluid against said rotors to produce forces, by reason of the Magnus effect, which tend to rotate said driven shaft, and a guide member for at least one of said rotors disposed at the side of and angularly movable about the axis of rotation of the related rotor which is downstream with respect to the stream of fluid directed against the latter.

2. A transmission device comprising a rotated driving shaft, a driven shaft, a plurality of rotors, means rotatably mounting said rotors on said driven shaft at locations spaced radially from the axis of the latter, fluid displacing means operated in response to rotation of said driving shaft, means for rotating said rotors, guide means receiving fluid from said fluid displacing means and directing streams of fluid against said rotors to produce forces, by reason of the Magnus effect, which tend to rotate said driven shaft, a casing into which said driving and driven shafts extend and within which said rotors, fluid displacing means, means for rotating the rotors and guide means are all disposed, additional guide means within said casing adjacent the path of rotation of said rotors with said driven shaft and adapted to direct said streams of fluid after the latter have passed said rotors, said additional guide means including second rotors rotatably mounted within said casing with axes parallel to the axis of the first mentioned rotors, and means driven by rotation of said driving shaft to rotate said second rotors in the direction counter to the rotation of said first rotors.

3. A transmission device comprising a casing, co-axial driving and driven shafts extending into said casing, a plurality of rotors, means rotatably mounting said rotors on said driven shaft with the axis of rotation of said rotors being parallel to, and spaced radially from, the axis of rotation of said driven shaft, means operative to rotate said rotors in response to the rotation of said driving shaft relative to said driven shaft, a radial impeller on said driving shaft operative, in response to rotation of the latter, to axially receive fluid within said casing and to discharge the fluid radially outward within the casing, guide means within the casing receiving fluid from said impeller and directing streams of the fluid radially inward past said rotors toward the aligned axis of said shafts so that, when said driving shaft rotates relative to said driven shaft to cause rotation of said rotors, the streams of fluid flowing past the rotated rotors produce forces, by reason of the Magnus effect, which tend to rotate said driven shaft with said driving shaft, additional guide means within said casing acting on the streams of fluid after the latter have passed said rotors and directing the fluid axially back to said impeller, said additional guide means including second rotors, means mounting said second rotors within said casing for rotation about axes which are fixed relative to the latter and which are parallel to the axis of said shafts and located radially inward with respective to the path followed by the first mentioned rotors in rotating with said driven shaft, and means rotating said second rotors in the direction counter to the rotation of said first rotors in response to rotation of said driving shaft, thereby to return the streams of fluid back to radial paths after the streams have passed said first rotors.

References Cited in the file of this patent

UNITED STATES PATENTS 2,608,884    Orner _____ Sept. 2, 1952